US011226429B2

(12) United States Patent
Chen et al.

(10) Patent No.: US 11,226,429 B2
(45) Date of Patent: Jan. 18, 2022

(54) EXTENSIBLE MILLIMETER WAVE SECURITY INSPECTION SYSTEM, SCANNING UNIT AND SECURITY INSPECTION METHOD FOR HUMAN BODY

(71) Applicant: NUCTECH COMPANY LIMITED, Beijing (CN)

(72) Inventors: Zhiqiang Chen, Beijing (CN); Ziran Zhao, Beijing (CN); Yuanjing Li, Beijing (CN); Xilei Luo, Beijing (CN); Yingkang Jin, Beijing (CN); Zhimin Zheng, Beijing (CN); Wanlong Wu, Beijing (CN); Lingbo Qiao, Beijing (CN); Wenguo Liu, Beijing (CN)

(73) Assignee: Nuctech Company Limited, Beijing (CN)

( * ) Notice: Subject to any disclaimer, the term of this patent is extended or adjusted under 35 U.S.C. 154(b) by 376 days.

(21) Appl. No.: 16/296,686

(22) Filed: Mar. 8, 2019

(65) Prior Publication Data

US 2019/0277999 A1 Sep. 12, 2019

(30) Foreign Application Priority Data

Mar. 9, 2018 (CN) .......................... 201810198089.5

(51) Int. Cl.
*G01V 8/00* (2006.01)
*G01S 13/89* (2006.01)
(Continued)

(52) U.S. Cl.
CPC ............ *G01V 8/005* (2013.01); *G01S 13/887* (2013.01); *G01S 13/89* (2013.01); *G01V 8/26* (2013.01)

(58) Field of Classification Search
CPC .................................................... G01S 13/887
See application file for complete search history.

(56) References Cited

U.S. PATENT DOCUMENTS 5,455,590 A * 10/1995 Collins ................. G01S 13/887
                                                      342/179
5,859,609 A *  1/1999 Sheen .................... G01S 7/412
                                                      342/179

(Continued)

FOREIGN PATENT DOCUMENTS

CN       106546981 A      3/2017
CN       106646463 A      5/2017

(Continued)

OTHER PUBLICATIONS

Partial European Search Report for European Patent Application No. 19161363.7 dated Aug. 5, 2019, 13 pages.

(Continued)

*Primary Examiner* — Peter M Bythrow
(74) *Attorney, Agent, or Firm* — Merchant & Gould P, C.

(57) ABSTRACT

An extensible millimeter wave security inspection system, a security inspection method for a human body using the extensible millimeter wave security inspection system and an extensible millimeter wave scanning unit are disclosed. The extensible millimeter wave security inspection system includes at least one security inspection passage, at least one scanning units are provided on at least one side of two sides of each security inspection passage, each scanning unit includes at least one millimeter wave transceiving module, the millimeter wave transceiving module includes an array of millimeter wave antennas configured to transmit and receive millimeter wave signals and a millimeter wave transceiver associated with the array of millimeter wave antennas, and the millimeter wave transceiving module is arranged to scan by millimeter wave a target to be inspected in the security inspection passage along a direction in which the security inspection passage extends.

19 Claims, 10 Drawing Sheets

(51) Int. Cl.
G01V 8/26 (2006.01)
G01S 13/88 (2006.01)

(56) References Cited

U.S. PATENT DOCUMENTS

| | | | | |
|---|---|---|---|---|
| 6,937,182 B2* | 8/2005 | Lovberg | ............... | G01S 13/887 342/179 |
| 6,965,340 B1* | 11/2005 | Baharav | ............... | G01S 13/89 342/22 |
| 7,119,740 B2* | 10/2006 | Blasing | ............... | G01S 13/887 342/179 |
| 7,123,185 B2* | 10/2006 | Fleisher | ............... | G01S 7/411 342/179 |
| 7,248,204 B2* | 7/2007 | Lovberg | ............... | G01V 8/005 342/179 |
| 7,365,672 B2* | 4/2008 | Keller | ............... | G01N 21/3581 342/179 |
| 7,710,307 B2* | 5/2010 | Weinzierl | ............... | G01V 8/005 342/25 A |
| 7,804,442 B2* | 9/2010 | Ammar | ............... | G01S 17/89 342/22 |
| 7,844,081 B2* | 11/2010 | McMakin | ............... | G06K 9/00348 382/115 |
| 7,973,697 B2* | 7/2011 | Reilly | ............... | G01S 7/411 342/22 |
| 7,978,120 B2* | 7/2011 | Longstaff | ............... | G01S 13/48 342/22 |
| 8,674,875 B2* | 3/2014 | Carter | ............... | G01S 13/04 342/179 |
| 8,723,716 B2* | 5/2014 | Nakasha | ............... | G01S 13/89 342/21 |
| 8,779,965 B2* | 7/2014 | Sentelle | ............... | G01S 13/56 342/22 |
| 8,841,618 B2* | 9/2014 | Jeck | ............... | G01V 8/005 250/353 |
| 9,316,732 B1* | 4/2016 | Mohamadi | ............... | H01Q 21/061 |
| 9,417,356 B2* | 8/2016 | Chen | ............... | G01V 8/005 |
| 9,891,314 B2* | 2/2018 | Morton | ............... | G01S 13/87 |
| 10,804,942 B2* | 10/2020 | Hay | ............... | H04B 1/0475 |
| 2004/0023612 A1* | 2/2004 | Kriesel | ............... | G06K 9/00342 452/157 |
| 2004/0080448 A1* | 4/2004 | Lovberg | ............... | G01V 8/005 342/22 |
| 2004/0140924 A1* | 7/2004 | Keller | ............... | G01S 13/887 342/22 |
| 2004/0263379 A1* | 12/2004 | Keller | ............... | G01N 21/3563 342/22 |
| 2005/0093733 A1* | 5/2005 | Lovberg | ............... | G01V 8/005 342/22 |
| 2005/0122249 A1* | 6/2005 | Grudkowski | ............... | G01S 13/89 342/22 |
| 2006/0017605 A1* | 1/2006 | Lovberg | ............... | G01K 7/226 342/22 |
| 2007/0276240 A1* | 11/2007 | Rosner | ............... | A61B 8/0825 600/437 |
| 2008/0100510 A1* | 5/2008 | Bonthron | ............... | H01Q 21/061 342/373 |
| 2008/0191925 A1* | 8/2008 | Martin | ............... | G01V 8/005 342/22 |
| 2008/0303708 A1 | 12/2008 | Daly et al. | | |
| 2009/0073023 A1* | 3/2009 | Ammar | ............... | G01S 17/89 342/22 |
| 2010/0214150 A1* | 8/2010 | Lovberg | ............... | H01Q 3/06 342/22 |
| 2010/0265117 A1* | 10/2010 | Weiss | ............... | G01S 13/003 342/22 |
| 2013/0121529 A1* | 5/2013 | Fleisher | ............... | G06K 9/78 382/103 |
| 2015/0048251 A1* | 2/2015 | Chen | ............... | G01V 8/005 250/349 |
| 2015/0048253 A1* | 2/2015 | Wu | ............... | G01S 13/89 250/393 |
| 2015/0048964 A1* | 2/2015 | Chen | ............... | G01S 13/887 342/22 |
| 2015/0323664 A1* | 11/2015 | Wu | ............... | G01V 8/005 342/22 |
| 2016/0187529 A1* | 6/2016 | Chen | ............... | G01V 3/12 342/27 |
| 2016/0259047 A1* | 9/2016 | Blech | ............... | G01S 7/02 |
| 2017/0254750 A1 | 9/2017 | Xin et al. | | |
| 2018/0173161 A1* | 6/2018 | Chen | ............... | G01N 22/00 |
| 2018/0321373 A1* | 11/2018 | Qi | ............... | G01S 13/9088 |
| 2018/0321374 A1* | 11/2018 | Qi | ............... | G01V 8/005 |
| 2019/0004171 A1* | 1/2019 | Qi | ............... | G01V 9/00 |
| 2019/0064342 A1* | 2/2019 | Daisy | ............... | G01S 13/887 |
| 2019/0196004 A1* | 6/2019 | Zhao | ............... | G01S 13/34 |
| 2019/0227190 A1* | 7/2019 | Qi | ............... | G01V 8/10 |
| 2019/0260121 A1* | 8/2019 | Qi | ............... | G01V 3/17 |
| 2019/0293833 A1* | 9/2019 | Chen | ............... | G01V 8/005 |
| 2019/0391531 A1* | 12/2019 | Qi | ............... | G01S 13/9011 |
| 2020/0333504 A1* | 10/2020 | Chen | ............... | G01S 13/9027 |
| 2021/0088649 A1* | 3/2021 | Qi | ............... | G01S 13/886 |

FOREIGN PATENT DOCUMENTS

| | | |
|---|---|---|
| CN | 206209132 U | 5/2017 |
| EP | 3 396 405 A1 | 10/2018 |
| GB | 2 517 237 A | 2/2015 |
| WO | 2017/107283 A1 | 6/2017 |
| WO | 2017/107515 A1 | 6/2017 |
| WO | 2017/113815 A1 | 7/2017 |

OTHER PUBLICATIONS

Examination Report No. 1 for corresponding Australian Patent Application No. 2019201619 dated Sep. 30, 2019, 7 pages.
Extended European Search Report for corresponding European Patent Application No. 19161363.7 dated Jan. 7, 2020, 21 pages.

* cited by examiner

EXTENSIBLE MILLIMETER WAVE SECURITY INSPECTION SYSTEM, SCANNING UNIT AND SECURITY INSPECTION METHOD FOR HUMAN BODY

CROSS-REFERENCE TO RELATED APPLICATION

This application claims priority benefit to Chinese Application No. 201810198089.5, filed with CNIPA on Mar. 9, 2018, incorporated herein by reference in its entirety.

TECHNICAL FIELD

The present disclosure relates to the field of millimeter wave security inspection, and in particular, to an extensible millimeter wave security inspection system, an extensible millimeter wave scanning unit and a security inspection method for a human body using the extensible millimeter wave security inspection system. By means of combining modular units to extend security inspection, it may allow several human bodies to be inspected simultaneously for security.

BACKGROUND

Known security inspection apparatuses for human bodies mainly include metal detection doors, trace inspection instruments, X-ray transmission apparatuses for human bodies. In particular, the metal doors are only sensitive to detection of metal substances. The trace inspection instruments are only efficient for detection of explosives and drugs. The X-ray transmission apparatuses for human bodies detect for example metal/non-metal substances, explosives or drugs and may have higher space resolution and a certain scanning speed. However, ionizing radiation of the X-ray can damage health of the human body, thus, it is limited for security inspection of human body.

In comparison with the above known inspection apparatuses, millimeter wave inspection imaging technology has numerous advantages such as, it can avoid the ionizing radiation, can achieve image through clothes of the human body and can recognize all kinds of metal and non-metal contrabands. In recent tens of years, with development of the millimeter wave technology and reduction of device costs, more attention has been paid to the millimeter wave technology gradually in security inspection for the human body. The millimeter wave detection imaging technology is mainly classified into passive millimeter wave imaging technology and active millimeter wave imaging technology. Holographic imaging technology is a prominent active millimeter wave imaging technology. In comparison with the passive millimeter wave imaging technology, the active millimeter wave can have a clear image, a high resolution and can better meet requirement of security inspection.

Known active millimeter wave security inspection imaging systems mainly include a cylindrical scanning system, a plane scanning system and an array scanning system. Due to limitation of imaging time, a person to be inspected needs to stand in front of the security inspection system for human body for a certain period until the inspection ends. Thus, the throughput of the security inspection is limited greatly. In practice, the conventional apparatus only can support the detection for one target. If a plurality of human bodies need to be inspected, a plurality of apparatuses are necessary. It will increase costs and footprints significantly.

SUMMARY

An embodiment of the present disclosure provides an extensible millimeter wave security inspection system including: at least one security inspection passage each provided with at least one scanning unit at at least one side of two sides thereof, each scanning unit including at least one millimeter wave transceiving module, and wherein the millimeter wave transceiving module includes an array of millimeter wave antennas configured to transmit and receive millimeter wave signals and a millimeter wave transceiver associated with the array of millimeter wave antennas, and the millimeter wave transceiving module is arranged to scan, by millimeter wave, a target to be inspected in the security inspection passage along a direction in which the security inspection passage extends.

In an embodiment, the at least one security inspection passage includes a first security inspection passage and a second security inspection passage adjacent to each other, and wherein a common scanning unit is provided between the first security inspection passage and the second security inspection passage to separate the first security inspection passage from the second security inspection passage.

In an embodiment, each scanning unit includes: a first linear transmission device and a second linear transmission device, and wherein the millimeter wave transceiving module is slidably connected to the first linear transmission device and the second linear transmission device, the first linear transmission device and the second linear transmission device being arranged to drive the millimeter wave transceiving module to move along the direction in which the security inspection passage extends to achieve scanning operation.

In an embodiment, each of the first linear transmission device and the second linear transmission device includes: a rail, a slider, a driving wheel and a transmission belt, the slider being fixed to the millimeter wave transceiving module and the transmission belt and slidably connected to the rail, the driving wheel being engaged with the transmission belt to drive the transmission belt to move; and each scanning unit further includes: connection shafts connected to the driving wheels of the first linear transmission device and the second linear transmission device respectively; and a motor arranged to drive the connection shafts to rotate.

In an embodiment, the driving wheel includes a synchronous gear and the transmission belt includes a synchronous toothed belt.

In an embodiment, each scanning unit further includes: a position sensor configured to acquire position information of the millimeter wave transceiving module in the direction in which the security inspection passage extends; and an optical camera configured to acquire an optical image of the target.

In an embodiment, the direction in which the security inspection passage extends is a horizontal direction and the array of millimeter wave antennas is arranged in a vertical direction.

In an embodiment, the at least one scanning unit includes a first scanning unit, the first scanning unit having a single millimeter wave transceiving module, and wherein the millimeter wave transceiving module is configured to move back and forth along the direction in which the security inspection passage extends, so as to scan and image single target to be inspected.

In an embodiment, the at least one scanning unit at least includes two first scanning units adjacent to each other, and wherein the millimeter wave transceiving module in one of the two first scanning units faces towards a security inspection passage which is different from a security inspection passage towards which the millimeter wave transceiving module in the other of the two first scanning units faces.

In an embodiment, the at least one scanning unit includes a second scanning unit provided with a first millimeter wave transceiving module and a second millimeter wave transceiving module, and wherein the first millimeter wave transceiving module and the second millimeter wave transceiving module are located on two opposite sides of the second scanning unit respectively and configured to move back and forth independently and respectively along the direction in which the security inspection passage extends, so as to scan and image two targets to be inspected independently.

In an embodiment, the first millimeter wave transceiving module and the second millimeter wave transceiving module are configured to move in opposite directions.

In an embodiment, the at least one scanning unit includes a third scanning unit provided with a first millimeter wave transceiving module and a second millimeter wave transceiving module, and wherein the first millimeter wave transceiving module and the second millimeter wave transceiving module are located on two sides of the third scanning unit respectively and driven by a common linear transmission device to move back and forth synchronously along the direction in which the security inspection passage extends, so as to scan and image two targets to be inspected synchronously.

In an embodiment, the extensible millimeter wave security inspection system further includes two or more scanning units arranged side by side in a direction perpendicular to the direction in which the security inspection passage extends to form the security inspection passage between adjacent scanning units.

In an embodiment, the extensible millimeter wave security inspection system further includes two or more scanning units arranged side by side in a direction parallel to the direction in which the security inspection passage extends to scan a plurality of targets to be inspected in a same security inspection passage simultaneously.

In an embodiment, all of the millimeter wave transceiving modules in the two or more scanning units are arranged to slide along a same common rail.

In an embodiment, all of the millimeter wave transceiving modules in the two or more scanning units are arranged to scan the targets to be inspected independently.

In an embodiment, the extensible millimeter wave security inspection system further includes: a data processing device connected by wires or wirelessly to one or more of the millimeter wave transceiving modules to receive holographic data acquired by scanning the targets to be inspected by the one or more of the millimeter wave transceiving modules, wherein each scanning unit further includes an optical camera configured to acquire an optical image of the target, the data processing device being connected by wires or wirelessly to the optical camera to receive the optical image of the target acquired by the optical camera and process the holographic data and the optical image of the target to give inspection information; and the extensible millimeter wave security inspection system further includes a display device connected to the data processing device and configured to receive and display the inspection information on one or more targets from the data processing device.

An embodiment of the present disclosure also provides a security inspection method for a human body using an extensible millimeter wave security inspection system, the extensible millimeter wave security inspection system including a plurality of security inspection passages separated by scanning units, the security inspection method including: assigning security inspection positions for a plurality of targets to be inspected and guiding the plurality of targets to the security inspection positions in security inspection passages corresponding to the plurality of targets respectively; detecting images at the security inspection positions by an optical camera to determine whether the plurality of targets reach the assigned security inspection positions or not and starting scanning operation after determining the plurality of targets have reached the assigned security inspection positions; scanning the plurality of targets simultaneously using the extensible millimeter wave security inspection system to acquire millimeter wave images and optical images of the plurality of targets; automatically recognizing the millimeter wave images of the plurality of targets to determine a suspicious target; identifying the plurality of targets using the optical images; matching the millimeter wave images of the plurality of targets with the optical images of the plurality of targets to determine identity of the suspicious target.

An embodiment of the present disclosure also provides an extensible millimeter wave scanning unit, including: a first millimeter wave transceiving module including a first array of millimeter wave antennas configured to transmit and receive millimeter wave signals and a first millimeter wave transceiver associated with the first array of millimeter wave antennas, the first array of millimeter wave antennas being arranged in a vertical direction; a second millimeter wave transceiving module including a second array of millimeter wave antennas configured to transmit and receive millimeter wave signals and a second millimeter wave transceiver associated with the second array of millimeter wave antennas, the second array of millimeter wave antennas being arranged in the vertical direction; and at least one group of linear transmission devices, the first millimeter wave transceiving module and the second millimeter wave transceiving module being slidably connected to a same group of the at least one group of linear transmission devices, the linear transmission devices being configured to drive the first millimeter wave transceiving module and the second millimeter wave transceiving module to move in a horizontal direction, wherein the second millimeter wave transceiving module and the first millimeter wave transceiving module are arranged back to back and configured to be driven by the same group of linear transmission devices to move synchronously.

An embodiment of the present disclosure also provides an extensible millimeter wave scanning unit, including: a first millimeter wave transceiving module including a first array of millimeter wave antennas configured to transmit and receive millimeter wave signals and a first millimeter wave transceiver associated with the first array of millimeter wave antennas, the first array of millimeter wave antennas being arranged in a vertical direction; a second millimeter wave transceiving module including a second array of millimeter wave antennas configured to transmit and receive millimeter wave signals and a second millimeter wave transceiver associated with the second array of millimeter wave antennas, the second array of millimeter wave antennas being arranged in the vertical direction; and a first group of linear transmission devices and a second group of linear transmission devices, the first millimeter wave transceiving module and the second millimeter wave transceiving module being slidably connected to the first group of linear transmission devices and the second group of linear transmission devices respectively, the first group of linear transmission devices and the second group of linear transmission devices being configured to drive the first millimeter wave transceiving module and the second millimeter wave transceiving module to move in a horizontal direction, wherein the second millimeter wave transceiving module and the first millimeter wave transceiving module are arranged back to back and configured to be driven by the first group of linear transmission devices and the second group of linear transmission devices respectively to move independently.

DETAILED DESCRIPTION OF EMBODIMENTS

Figure 1:
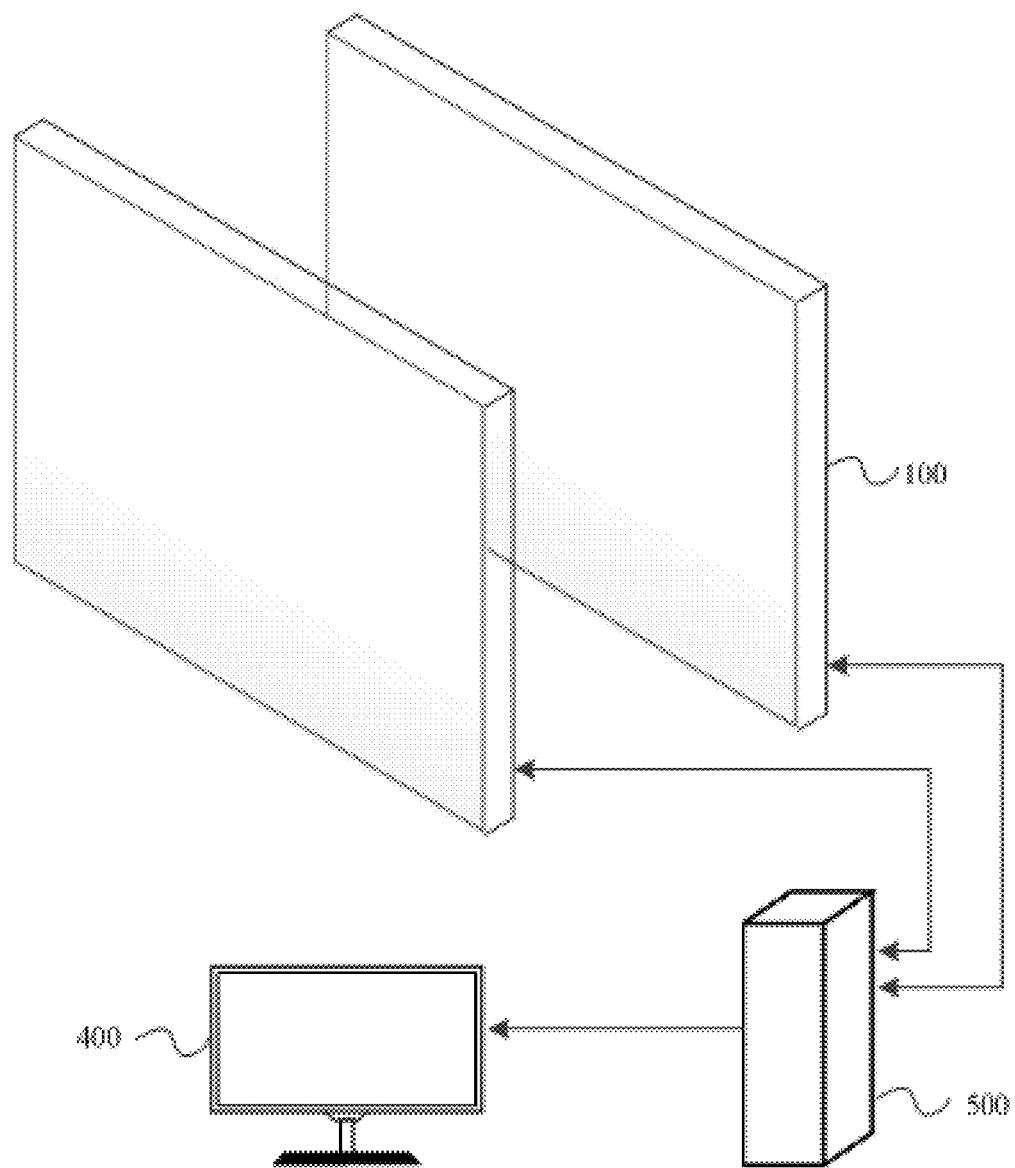
FIG. 1 is a schematic view showing a structure of an extensible millimeter wave security inspection system according to an embodiment of the present disclosure.

Technical solutions of the present disclosure will be described through embodiments in the present disclosure with reference to the drawings. Throughout the description, same or similar reference numerals represent same or similar parts. The following description of embodiments with reference to the drawings is intended to explain the general inventive concept of the present disclosure, rather than understood as a limitation to the present disclosure.

FIG. 1 is a schematic view showing an extensible millimeter wave security inspection system according to an embodiment of the present disclosure. The extensible millimeter wave security inspection system includes: one or more scanning units 100, a data process device 500 and a display device 400.

Figure 2:
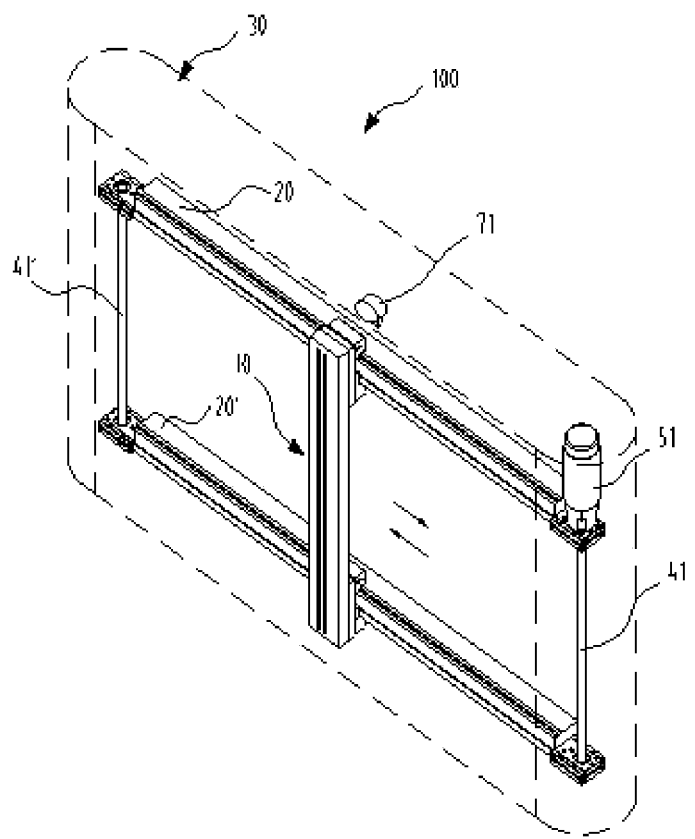
FIG. 2 is a schematic view showing a structure of a scanning unit of the extensible millimeter wave security inspection system according to an embodiment of the present disclosure.

The scanning unit 100 is a basic unit of the extensible millimeter wave security inspection system. The extensible millimeter wave security inspection system may be extended on a basis of the scanning unit. FIG. 2 shows a basic structure of the scanning unit 100. The scanning unit 100 includes: a millimeter wave transceiving module 10 (for example, arranged in a vertical direction), a first linear transmission device 20 and a second linear transmission device 20', a mechanical housing 30, two connection shafts 41 and 41', a motor (for example, a driving speed reduction motor) 51 and a position sensor 61.

The millimeter transceiving module 10 includes an array of millimeter wave antennas configured to transmit and receive millimeter wave signals and a millimeter wave transceiver associated with the array of millimeter wave antennas. A wideband millimeter wave signal is produced by the millimeter wave transceiver and is irradiated by millimeter wave transmitting antennas onto a target to be inspected. The millimeter wave signal reflected by the target to be inspected is received by millimeter wave receiving antennas and millimeter wave holographic data may be obtained by heterodyne mixing technique. The array of millimeter wave antennas is controlled by electronic switches and the transmitting units and the receiving units are switched fast in scanning, so as to achieve rapid scanning in the vertical direction.

Figure 3:
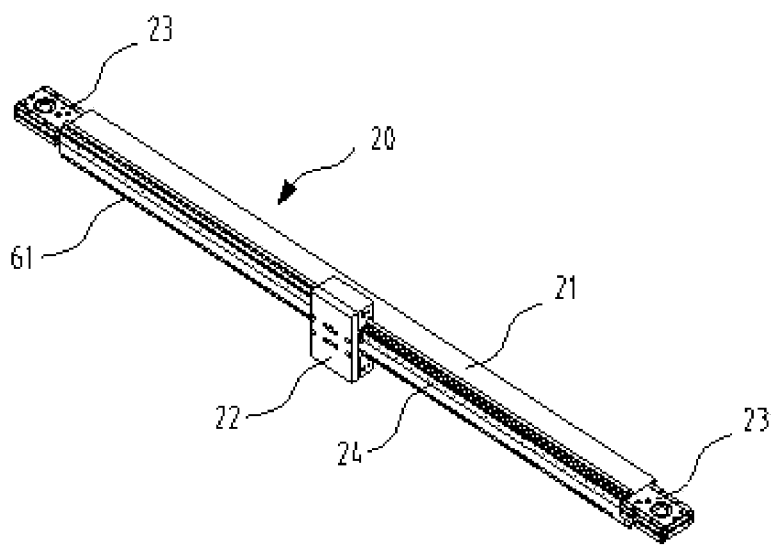
FIG. 3 is a schematic view showing a structure of a linear transmission device in the scanning unit of the extensible millimeter wave security inspection system according to an embodiment of the present disclosure.

The first linear transmission device 20 and the second linear transmission device 20' are configured to allow the millimeter wave transceiving module to move back and forth in a horizontal direction, to scan the target rapidly in the horizontal direction. The millimeter wave transceiving module 10 may be slidably connected to the first linear transmission device 20 and the second linear transmission device 20'. FIG. 3 shows a basis structure of the linear transmission device 20, including a rail 21, a slider 22, a driving wheel (for example synchronous gears) 23 and a transmission belt (for example a synchronous toothed belt) 24. The millimeter wave transceiving module 10 is connected to the first linear transmission device 20 and the second linear transmission device 20' via two sliders 22 (i.e., an upper slider and a lower slider). The sliders 22 are connected to the millimeter wave transceiving module 10 and the transmission belt 24. And the sliders 22 may be slidably connected to the rail 21 such that the sliders 22 can for example move back and forth in the horizontal direction. The driving wheel 23 is engaged with the transmission belt 24. When the driving wheel 23 rotates, it may drive the transmission belt 24 to move back and forth for example in the horizontal direction. The driving wheel 23 may be meshed with the transmission belt 24 to drive the transmission belt 24 to move.

The above first linear transmission device 20 and the second linear transmission device 20' may be regarded as a group of linear transmission devices. For example, the first linear transmission device 20 and the second linear transmission device 20' may be arranged in parallel to each other. In an embodiment of the present disclosure, the number of linear transmission devices in one group of linear transmission devices is not limited to two, for example, three or more linear transmission devices may be provided in one group of linear transmission devices as required.

As an example, the scanning unit 100 may further include the housing 30 as a shielding and protecting device of the scanning unit.

Two connection shafts 41 and 41' are connected to the driving wheels 23 on the first linear transmission device 20 and the second linear transmission device 20'. When one of the driving wheels rotates, it will drive the other of the driving wheels, so as to drive the transmission belts 24 of two (upper and lower) linear transmission drives (i.e., the first linear transmission device 20 and the second linear transmission device 20') to move back and forth in the horizontal direction. In the embodiments of the present disclosure, the number of the connection shafts is not limited to two, for example, one, three or more connection shaft(s) may be provided.

The motor (for example driving speed reduction motor) 51 is configured to drive one of the connection shafts 41 to rotate, so as to drive the driving wheels 23 and the transmission belts 24 of the two (upper and lower) linear transmission drives (i.e., the first linear transmission device 20 and the second linear transmission device 20') to move. In the embodiment of the present disclosure, so-called linear transmission device means a device that is configured to drive a desired component (for example, the millimeter wave transceiving module 10) to move along a straight line.

As an example, the scanning unit may further include the position sensor 61 and an optical camera 71. The position sensor 61 is configured to acquire position information of the millimeter wave transceiving module in a horizontal scanning process. Use of the position information may prevent blurring in millimeter wave images caused by movements.

The optical camera 71 is configured to record an optical image of the target, for example, it may determine whether the target reaches a correct inspection area or not before the scanning operation starts. In scanning, the optical camera 71 is configured to acquire the optical image of the target.

In an embodiment of the present disclosure, the extensible millimeter wave security inspection system may further a data processing device 500. The data processing device 500 may for example be connected by wires or wirelessly to one or more of controllers of the millimeter wave transceiving module 10, the optical camera 71 and the motor 51 in the scanning unit 100. When the scanning operation starts, the data processing device 500 may send scanning instructions to the millimeter wave transceiving module 10 and the motor 51 to start the millimeter wave transceiving module to work and the motor to rotate. The rapid scanning in the vertical direction may be achieved by switching operation of electronic switches of the array of antennas while the scanning operation in the horizontal direction may be achieved by horizontal movement of the millimeter wave transceiving module. After the scanning operations in two dimensions end, the acquired millimeter wave holographic data are transmitted by the millimeter wave transceiver to the data processing device 500. The data processing device 500 is configured to reconstruct images from the millimeter wave holographic data to form millimeter wave images and perform intelligent alarm by using an automatic recognition algorithm. At the same time, the data processing device 500 may also acquire the optical image of the target acquired from the optical camera 71 to identify the target by face recognition technique. The data processing device 500 may match the optical image of the target with the millimeter wave image of the target to provide comprehensive inspection information. The data processing device 500 may be a data processing terminal which has a certain computing capability, such as a computer or a tablet computer.

In an embodiment of the present disclosure, the extensible millimeter wave security inspection system further includes a display device 400. The display device 400 is configured to receive security inspection information outputted by the data processing device 500 and display the security inspection information at an exit for security inspection or on a remote display terminal. As the data processing device outputs both the identification information of the target and the alarm information of the security inspection simultaneously, the display device 400 may mark corresponding positions in the optical image with red frames to display the alarm information. Certainly, it may simultaneously display both the optical image and the millimeter wave image with the alarm frame or a cartoon image.

As an example, the extensible millimeter wave security inspection system may include: at least one security inspection passage 600. At least one scanning unit is provided at at least one side of two sides of each security inspection passage 600. Each scanning unit includes at least one millimeter wave transceiving module. The millimeter wave transceiving module is configured to scan the target in the security inspection passage with millimeter wave along the direction in which the security inspection passage 600 extends.

As an example, the at least one security inspection passage 600 may include a first security inspection passage 610 and a second security inspection passage 620 adjacent to each other. A common scanning unit (for example a first scanning unit 100, a second scanning unit 200 or a third scanning unit 600) is provided between the first security inspection passage 610 and the second security inspection passage 620 to separate the first security inspection passage 610 from the second security inspection passage 620. The common scanning unit described herein means that the scanning unit that has one scanning operation surface (such as the surface on which the millimeter wave transceiving module is arranged) facing towards the first security inspection passage 610 and the other scanning operation surface facing towards the second security inspection passage 620.

In the above embodiments, the moving direction (i.e., the scanning direction) of the millimeter wave transceiving module may be coincident with the direction in which the security inspection passage extends (for example the horizontal direction). The direction in which the array of millimeter wave antennas in the millimeter wave transceiving module is arranged may be coincident with the direction (for example the vertical direction) perpendicular to the direction in which the security inspection passage extends. As such, the position sensor may also be configured to determine the information on position of the millimeter wave transceiving module in the direction in which the millimeter wave transceiving module extends.

As an example, the at least one scanning unit may include a first scanning unit which has one millimeter wave transceiving module, as shown in FIG. 2. The millimeter wave transceiving module may move back and forth along the direction in which the millimeter wave transceiving module extends, so as to scan and image single target.

As an example, the at least one scanning unit may also at least include two first scanning units adjacent to each other. The millimeter wave transceiving module in one of the two first scanning units faces towards a security inspection passage which is different from the security inspection passage towards which the millimeter wave transceiving module in the other of the two first scanning units faces.

In an embodiment, two first scanning units 100 are arranged back to back and adjacent to each other, such that they can inspect two targets respectively.

Figure 4:
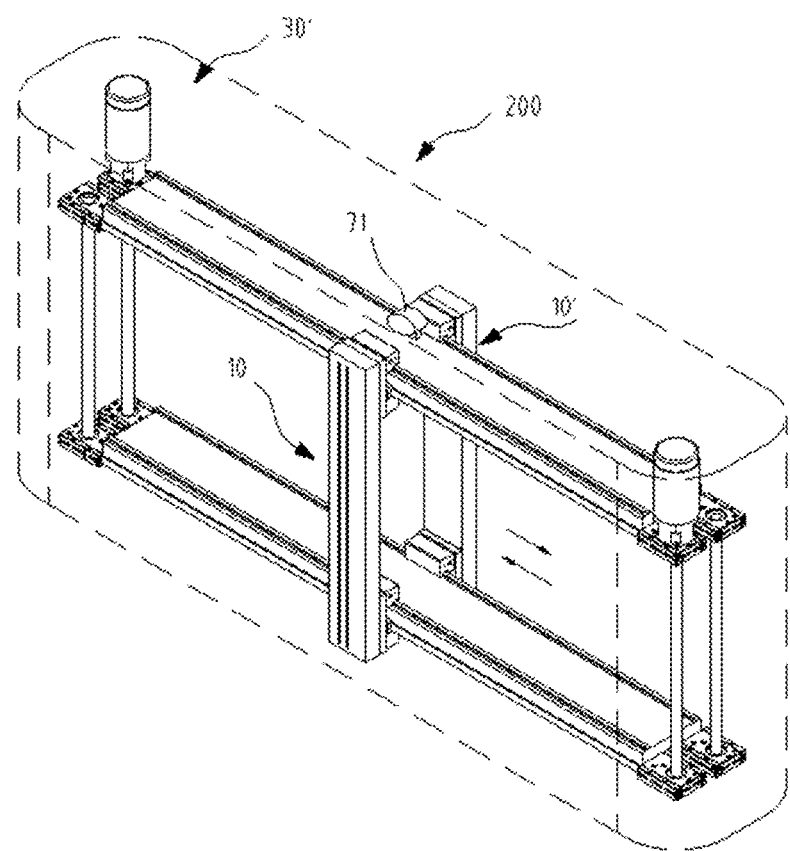
FIG. 4 is a schematic view showing another structure of a scanning unit of the extensible millimeter wave security inspection system according to an embodiment of the present disclosure.

As an example, the at least one scanning unit may also include a second scanning unit 200 which may include a first millimeter wave transceiving module 10 and a second millimeter wave transceiving module 10'. The first millimeter wave transceiving module 10 and the second millimeter wave transceiving module 10' are located on two opposite sides of the second scanning unit 200 respectively and move back and forth independently and respectively along the direction in which the security inspection passage extends, so as to scan and image two targets independently. As an example, the second scanning unit 200 may be composed of two integrated first scanning units 100 arranged back to back and adjacent to each other (for example, the linear transmission devices in two first scanning units 100 are arranged in one same frame, as shown in FIG. 4). The first millimeter wave transceiving module 10 and the second millimeter wave transceiving module 10' may move in the same direction or in opposite directions. The directions in which the first millimeter wave transceiving module 10 and the second millimeter wave transceiving module 10' move may be controlled independently as required.

As shown in FIG. 4, with two sets of independent transmission devices, the scanning unit may perform the security inspection on two targets independently. In an embodiment, the at least one scanning unit may also include a third scanning unit 300. The third scanning unit 300 includes the first millimeter wave transceiving module 10 and the second millimeter wave transceiving module 10'. The first millimeter wave transceiving module 10 and the second millimeter wave transceiving module 10' are located on two opposite sides of the third scanning unit 300 respectively and driven by the common linear transmission device to move back and forth synchronously along the direction in which the security inspection passage extends, so as to scan and image two targets synchronously.

It should be noted that, for both the second scanning unit 200 and the third scanning unit 300, the target is arranged outside of the first millimeter wave transceiving module 10 and the second millimeter wave transceiving module 10', instead of being arranged between the first millimeter wave transceiving module 10 and the second millimeter wave transceiving module 10'.

Figure 5:
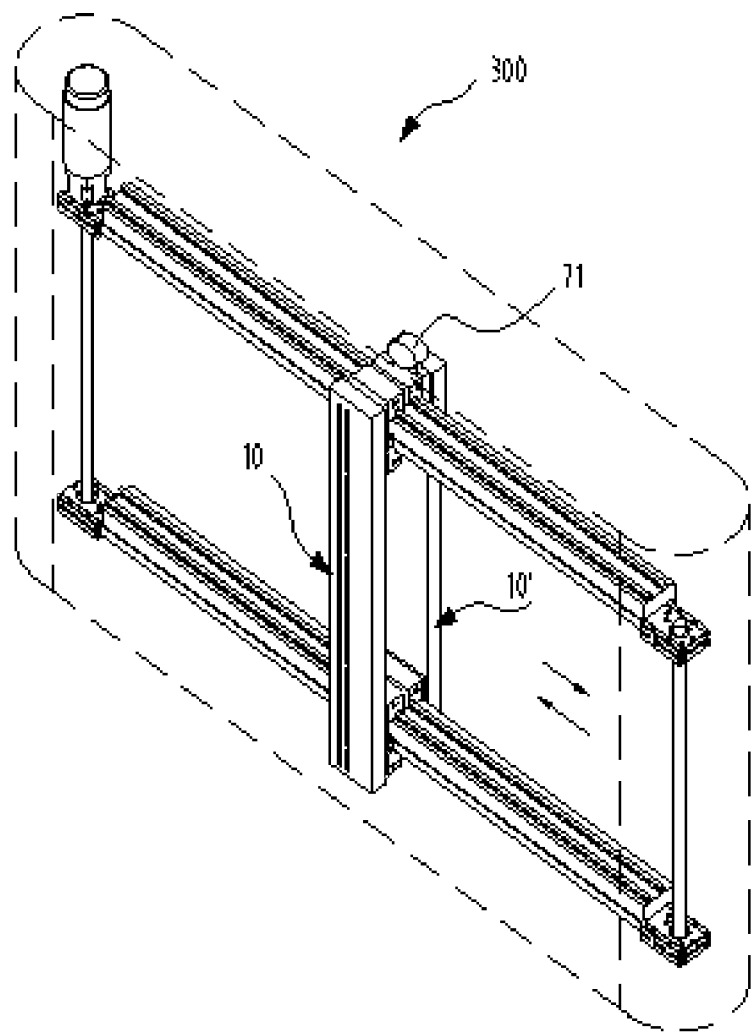
FIG. 5 is a schematic view showing a further structure of a scanning unit of the extensible millimeter wave security inspection system according to an embodiment of the present disclosure.

In an embodiment, in addition to the first millimeter wave transceiving module 10, the first scanning unit 100 of the extensible millimeter wave security inspection system may have another (second) millimeter wave transceiving module 10' and the corresponding rail and slider mounted on an opposite face of the first scanning unit 100. The second millimeter wave transceiving module 10' and the first millimeter wave transceiving module 10 share a group of transmission devices to form the third scanning unit 300 that can inspect two targets simultaneously, as shown in FIG. 5. In practice, during scanning, with driven by the transmission belt, two millimeter wave transceiving modules (i.e., the first millimeter wave transceiving module 10 and the second millimeter wave transceiving module 10') move back and forth along opposite directions, so as to scan the targets on two sides rapidly. The moving direction of each of the two millimeter wave transceiving modules may be the direction in which the security inspection passage extends (for example the horizontal direction). Since the two millimeter wave transceiving modules share the same group of transmission devices, the cost of system will be reduced significantly. As an example, the two millimeter wave transceiving modules may be misaligned or staggered with each other in movements. The two millimeter wave transceiving modules may be arranged back to back to scan spaces on two sides of the third scanning unit 300 respectively.

In an embodiment of the present disclosure, the direction in which the security inspection extends may for example be the horizontal direction; however, it may alternatively be, for example, a direction which is inclined with respect to the horizontal direction depending on the design requirement of the security inspection passage.

In an embodiment of the present disclosure, the extensible millimeter wave security inspection system can be extended transversely (for example, along the direction transverse to the direction in which the security inspection passage extends) and longitudinally (for example, along the direction in which the security inspection passage extends).

Figure 6:
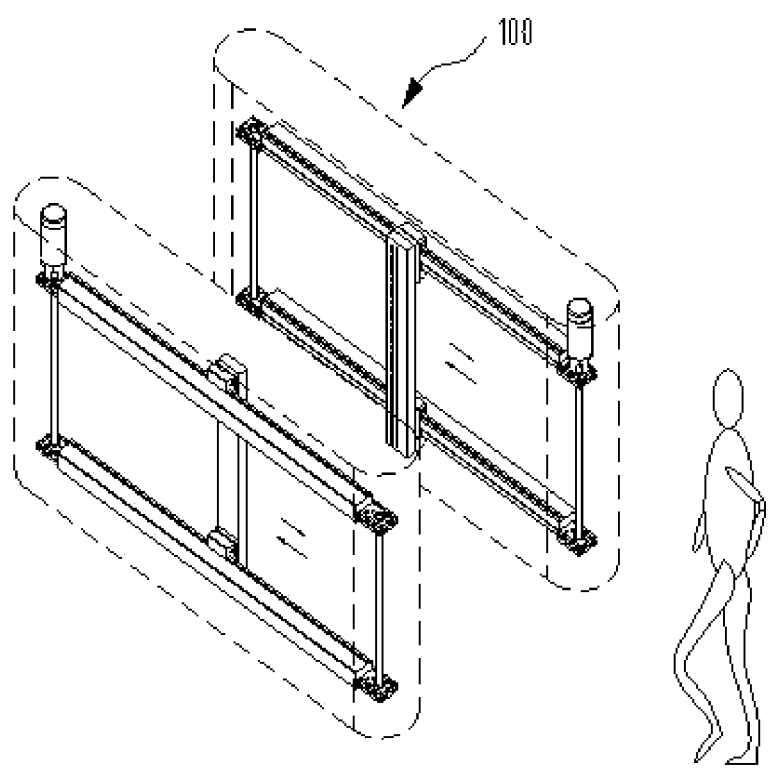
FIG. 6 is a schematic view showing a single-target security inspection passage composed by two scanning units according to an embodiment of the present disclosure.
Figure 7:
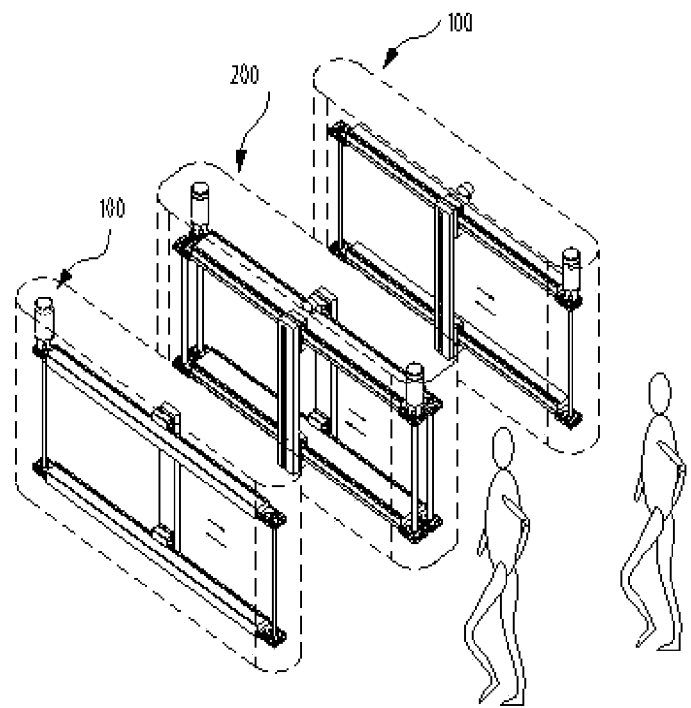
FIG. 7 is a schematic view showing double-target security inspection passages composed by three scanning units according to an embodiment of the present disclosure.
Figure 8:
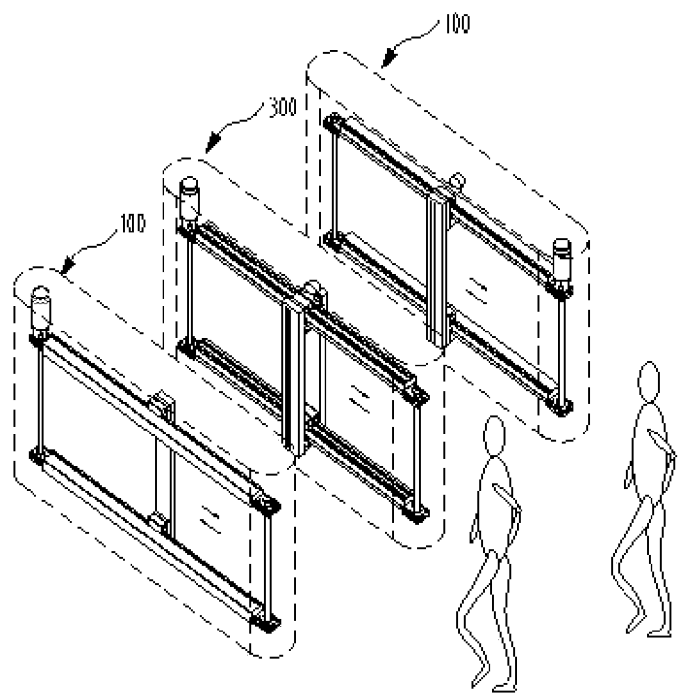
FIG. 8 is a schematic view showing double target-simultaneous security inspection passages composed by three scanning units according to an embodiment of the present disclosure.
Figure 9A:
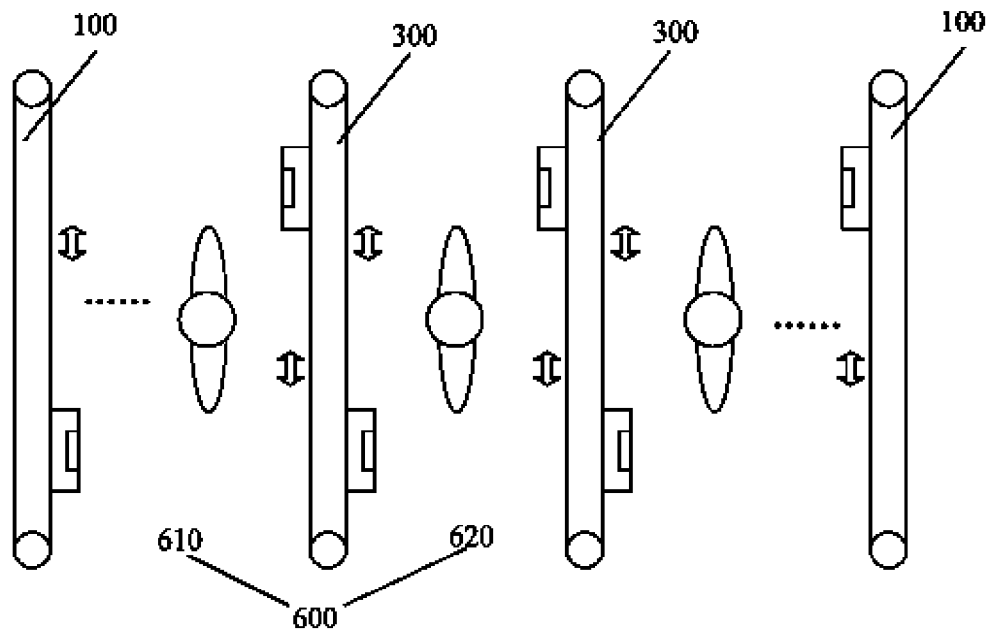
FIG. 9A and FIG. 9B are schematic views of traversal extension of the extensible millimeter wave security inspection system according to an embodiment of the present disclosure.
Figure 9B:
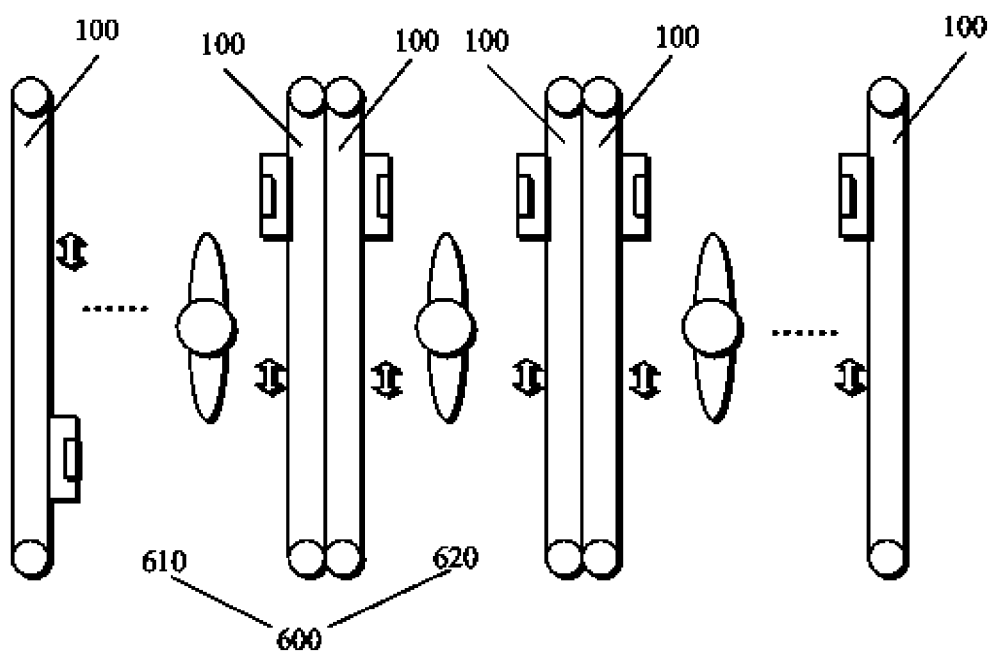

As an example, the extensible millimeter wave security inspection system includes two or more scanning units. The two or more scanning units are arranged side by side in a direction perpendicular to the direction in which the security inspection passage extends such that the security passage can be formed between adjacent scanning units. As an embodiment, the extensible millimeter wave security inspection system may be extended transversely. A plurality of extensible millimeter wave units are arranged transversely and there are a certain distance between two adjacent extensible millimeter wave units such that a plurality of millimeter wave security inspection passages can be formed to perform the security inspection on a plurality of targets. In an example, two first scanning units 100 are arranged to face towards each other and there are a certain distance between the two first scanning units 100 such that the security inspection passage for single target can be formed, as shown in FIG. 6. After the target enters the security inspection passage, it stands to face one of the first scanning units 100. The two first scanning units 100 finish the security inspection on two (front and back) sides of the target respectively. In an example, the first scanning unit 100, the second scanning unit 200 and the first scanning unit 100 are arranged sequentially with a certain distance between adjacent scanning units, so as to form two security inspection passages that can inspect two targets independently, as shown in FIG. 7. Two targets enter the two security inspection passages respectively for security inspection, thus security inspections of the two targets are not disturbed by each other. In an example, the first scanning unit 100, the third scanning unit 300 and the first scanning unit 100 are arranged sequentially with a certain distance between adjacent scanning units, so as to form two security inspection passages that can inspect two targets simultaneously, as shown in FIG. 8. Two targets enter the two security inspection passages respectively, and after they reach the predetermined positions, the first scanning unit 100, the third scanning unit 300 and the first scanning unit 100 scan the two targets simultaneously. In an example, a plurality of the third scanning units 300 are arranged and spaced apart transversely in sequence and two first scanning units 100 are arranged on either side of combination of the plurality of the third scanning units 300, as shown in FIG. 9A, so as to form a plurality of security inspection passages that can scan the plurality of targets independently. In an example, a plurality of modules composed of two first scanning units 100 arranged back to back and adjacent to each other (the module may be replaced by the second scanning unit 200) are arranged and spaced apart transversely in sequence and two first scanning units 100 are arranged on either side of combination of the modules, as shown in FIG. 9B, so as to form a plurality of security inspection passages that can scan the plurality of targets independently.

Figure 10A:
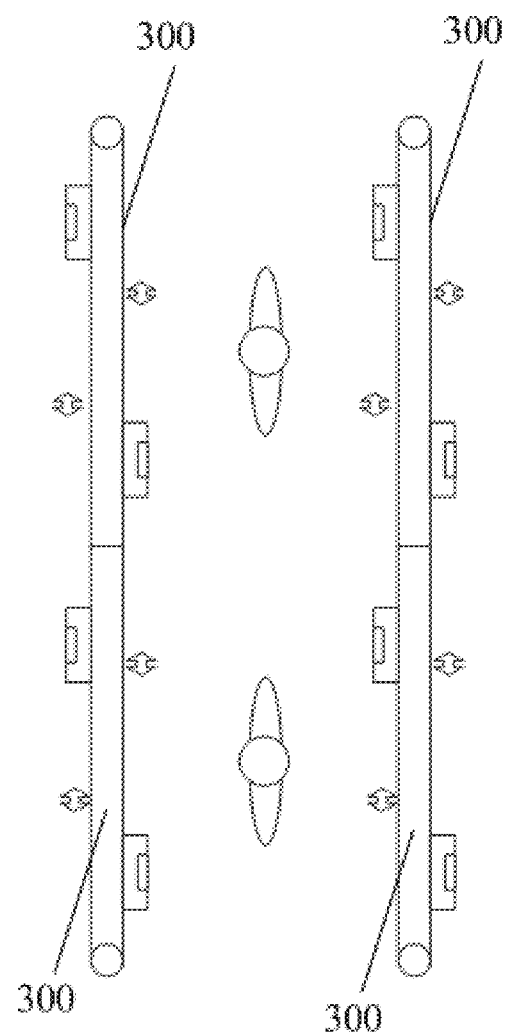
FIG. 10A and FIG. 10B are schematic views of longitudinal extension of the extensible millimeter wave security inspection system according to an embodiment of the present disclosure.
Figure 10B:
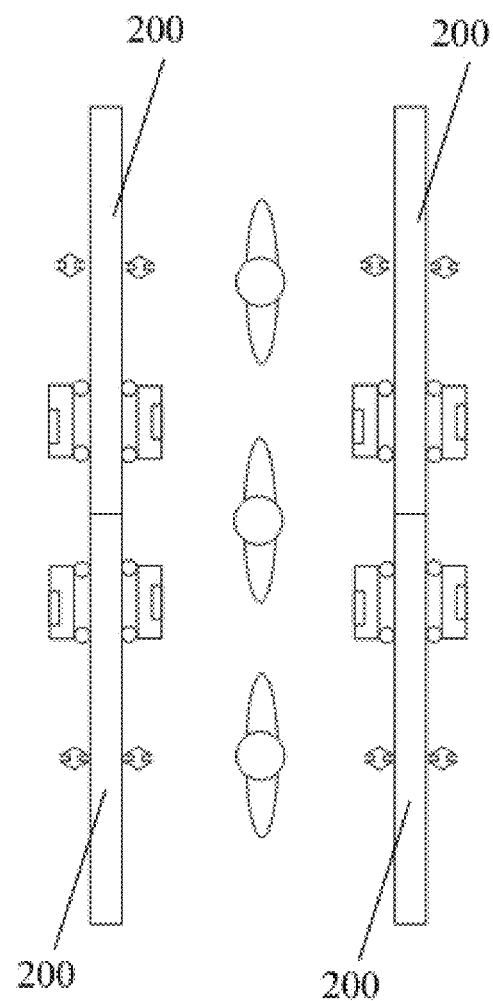

In an embodiment, the extensible millimeter wave security inspection system may be extended longitudinally. By increasing rail length of the first scanning unit 100 (or the second scanning unit 200, the third scanning unit 300) in the longitudinal direction and adding the millimeter wave transceiving modules correspondingly, the security inspection on a plurality of targets can be achieved in one security inspection passage. As shown in FIG. 10A, the rail length of the third scanning unit 300 (alternatively, the first scanning unit 100 or the second scanning unit 200) has been extended and the millimeter wave transceiving modules have been added at the corresponding positions such that the security inspection on two targets may be performed in the same security inspection passage. Since the group of transmission devices are shared, the cost of system for inspecting multiple targets simultaneously can be reduced significantly. In an example, each millimeter wave transceiving module carries independent transmission devices and thus may be moved freely on longitudinally extended rails, so as to cover the security inspection region within a whole rail range. As shown in FIG. 10B, the security inspection on a plurality of targets may be performed in the same passage by using the second scanning unit 200 having independent transmission devices. As an example, in the above embodiment of longitudinally extended millimeter wave security inspection system, rails of different scanning units may be jointed to form a common rail across a plurality of scanning units such that the same millimeter wave transceiving module can move across different scanning units, to improve scanning range of the millimeter wave transceiving module.

It should be noted that FIG. 2 to FIG. 5 only give exemplified structures of the first scanning unit 100, the second scanning unit 200 and the third scanning unit 300. Embodiments of the present disclosure are not limited to those. For example, the linear transmission structure with belts and wheels may be replaced by other transmission structures that are not be limited to the transmission belt, for example the other known means in the art such as rail suspension wheels or magnetic wheels, as long as the above function requirements of the first scanning unit 100, the second scanning unit 200 and the third scanning unit 300 can be satisfied.

As an example, the extensible millimeter wave security inspection system includes two or more scanning units. The two or more scanning units are arranged side by side in a direction parallel to the direction in which the security inspection passage extends and configured to scan the plurality of targets in the same security inspection passage simultaneously. For example, all of millimeter wave transceiving modules in the two or more scanning units may be arranged to slide along a same common rail. For example again, all of millimeter wave transceiving modules in the two or more scanning units may be arranged to scan the targets independently.

By means of the transverse and longitudinal extensions, the extensible millimeter wave security inspection system may inspect one or more targets simultaneously. Since each scanning unit is an independent plate-shaped module, it facilitates arrangement of rapid security inspection and flexibility can be enhanced.

An embodiment of the present disclosure also provides a security inspection method for a human body using the extensible millimeter wave security inspection system. The extensible millimeter wave security inspection system includes a plurality of security inspection passages separated by scanning units. The method includes the following steps: assigning security inspection positions for a plurality of targets and guiding the plurality of targets to the security inspection positions in security inspection passages corresponding to the plurality of targets respectively; detecting images at the security inspection positions by an optical camera to determine whether the plurality of targets reach the security inspection positions or not and starting scanning operation after determining the plurality of targets have reached the security inspection positions; scanning the plurality of targets simultaneously using the extensible millimeter wave security inspection system to acquire millimeter wave images and optical images of the plurality of targets; automatically recognizing the millimeter wave images of the plurality of targets to determine suspicious targets; identifying the plurality of targets using the optical images; matching the millimeter wave images of the plurality of targets with the optical images of the plurality of targets to determine identification of the suspicious targets.

As an example, the above method may further include: when the identification of the targets have been determined, sending information on the suspicious targets to a remote terminal at a security inspection exit to intercept the suspicious targets.

Such method is very beneficial to improve the throughput of the security inspection system. In particular, in the crowded areas such as airports, stations, it may allow persons stay for a very short time when they pass through the security inspection system. If necessary, the suspicious targets can be intercepted by the remote terminal at a security inspection exit.

An embodiment of the present disclosure also provides an extensible millimeter wave scanning unit. The extensible millimeter wave scanning unit includes: a first millimeter wave transceiving module including a first array of millimeter wave antennas configured to transmit and receive millimeter wave signals and a first millimeter wave transceiver associated with the first array of millimeter wave antennas, the first array of millimeter wave antennas being arranged in a vertical direction; a second millimeter wave transceiving module including a second array of millimeter wave antennas configured to transmit and receive millimeter wave signals and a second millimeter wave transceiver associated with the second array of millimeter wave antennas, the second array of millimeter wave antennas being arranged in the vertical direction; at least one group of linear transmission devices, the first millimeter wave transceiving module and the second millimeter wave transceiving module being slidably connected to a same group of the at least one group of linear transmission devices, the linear transmission devices being configured to drive the first millimeter wave transceiving module and the second millimeter wave transceiving module to move in a horizontal direction. The second millimeter wave transceiving module and the first millimeter wave transceiving module are arranged back to back and configured to be driven by the same group of linear transmission devices to move synchronously. The third scanning unit 300 shown in FIG. 5 may be regarded as an example of the above extensible millimeter wave scanning unit. The examples of the specific structures of the linear transmission devices can be found in the above embodiments described previously. The details will be omitted herein.

An embodiment of the present disclosure also provides another extensible millimeter wave scanning unit. The extensible millimeter wave scanning unit includes: a first millimeter wave transceiving module including a first array of millimeter wave antennas configured to transmit and receive millimeter wave signals and a first millimeter wave transceiver associated with the first array of millimeter wave antennas, the first array of millimeter wave antennas being arranged in a vertical direction; a second millimeter wave transceiving module including a second array of millimeter wave antennas configured to transmit and receive millimeter wave signals and a second millimeter wave transceiver associated with the second array of millimeter wave antennas, the second array of millimeter wave antennas being arranged in the vertical direction; a first group of linear transmission devices and a second group of linear transmission devices, the first millimeter wave transceiving module and the second millimeter wave transceiving module being slidably connected to the first group of linear transmission devices and the second group of linear transmission devices respectively, the first group of linear transmission devices and the second group of linear transmission devices being configured to drive the first millimeter wave transceiving module and the second millimeter wave transceiving module to move in a horizontal direction. The second millimeter wave transceiving module and the first millimeter wave transceiving module are arranged back to back and configured to be driven by the first group of linear transmission devices and the second group of linear transmission devices respectively to move independently. The second scanning unit 200 that integrates two first scanning units 100 with each other shown in FIG. 4 may be regarded as an example of the above extensible millimeter wave scanning unit. The examples of the specific structures of the linear transmission devices can be found in the above embodiments described previously. The details will be omitted herein.

In some embodiments of the present disclosure, an extensible millimeter wave security inspection system is provided. The extensible millimeter wave security inspection system includes one or more scanning units forming different forms of security inspection passages. The scanning unit includes: a millimeter wave transceiving module arranged vertically, the millimeter wave transceiving module including an array of millimeter wave antennas configured to transmit and receive millimeter wave signals and a millimeter wave transceiver associated with the array of millimeter wave antennas; two linear transmission devices, the millimeter wave transceiving module being slidably connected to the linear transmission device to scan in a horizontal direction rapidly. The linear transmission devices each include: a rail configured to support the millimeter wave transceiving module and allow it to move in the horizontal direction, sliders fixed onto a top and a bottom of the millimeter wave transceiving module, synchronous gears and a synchronous toothed belt for transmission. The linear transmission device uses the synchronous gears and the synchronous toothed belt for transmitting motion. However, the present disclosure is not limited to such transmitting motion mode. The scanning unit further includes: a housing used as a shielding and protection device of the scanning unit; connection shafts engaged with the synchronous gears in the two linear transmission devices respectively; a driving speed reduction motor configured to drive one of the connection shafts to drive the synchronous toothed belt to move by the synchronous gears, so as to move the millimeter wave transceiving module back and forth in the horizontal direction; a position sensor configured to determine position information of the millimeter wave transceiving module moving the millimeter wave transceiving module back and forth in the horizontal direction; and an optical camera configured to acquire an optical image of the target to be inspected.

In an embodiment, the scanning unit includes one millimeter wave transceiving module which is driven by the driving speed reduction motor to move back and forth in the horizontal direction, so as to scan and image single target.

In an embodiment, two scanning units are arranged back to back and adjacent to each other. Two millimeter wave transceiving modules are driven by two driving speed reduction motors to move independently in the horizontal direction, so as to scan and image two targets independently.

In an embodiment, the scanning unit includes two millimeter wave transceiving modules arranged back to back. The two millimeter wave transceiving modules are driven by the same driving speed reduction motor to move back and forth in opposite horizontal directions, so as to scan and image two targets synchronously.

In an embodiment, two scanning units are arranged side by side to form a security inspection passage. The two scanning units are configured to scan and image two (i.e., front and back) sides of the same target respectively.

In an embodiment, the extensible millimeter wave security inspection system may be extended transversely. A plurality of scanning units are arranged side by side to form a plurality of millimeter wave security inspection passages. Each of the scanning units scans a certain side of two targets in adjacent passages and the plurality of scanning units work simultaneously such that millimeter wave images of the front and back sides of a plurality of targets can be acquired.

In an embodiment, the extensible millimeter wave security inspection system may be extended longitudinally. For example, the length of rail can be increased and a plurality of millimeter wave transceiving modules are arranged on a same rail. The plurality of millimeter wave transceiving modules may be driven by a same driving speed reduction motor to scan a plurality of targets in the same security inspection passage simultaneously.

In an embodiment, the scanning unit of the extensible millimeter wave security inspection system includes a rail and one or more millimeter wave transceiving modules arranged vertically and provided with independent transmission devices. The one or more millimeter wave transceiving modules may move back and forth along the rail in the horizontal direction, so as to scan and image a plurality targets rapidly in large field of view.

In an embodiment, the extensible millimeter wave security inspection system further includes a data processing device connected by wires or wirelessly to the one or more millimeter wave transceiving modules to receive holographic data from the one or more millimeter wave transceiving modules for scanning the targets. The data processing device is connected by wires or wirelessly to one or more optical cameras to receive the optical image of the target acquired by the one or more optical cameras. The data processing device is configured to reconstruct the acquired holographic data to obtain the millimeter wave image and perform intelligent alarm by using an automatic recognition algorithm. The data processing device is configured to identify the target based on the acquired optical image. The data processing device is configured to match the optical image of the target with the millimeter wave image of the target to provide comprehensive inspection information.

The extensible millimeter wave security inspection system may further include a display device. The display device is configured to receive the comprehensive inspection information for the one or more targets from the data processing device.

At least one of embodiments of the present disclosure can scan one or more targets to be inspected (for example human bodies) by one or more scanning units. The system has low cost, small footprint and is beneficial to rapid arrangement of the security inspection passages. The system has strong extensibility. By means of extension, the system can perform security inspection on a plurality of human bodies simultaneously with low cost.

Figure 11:
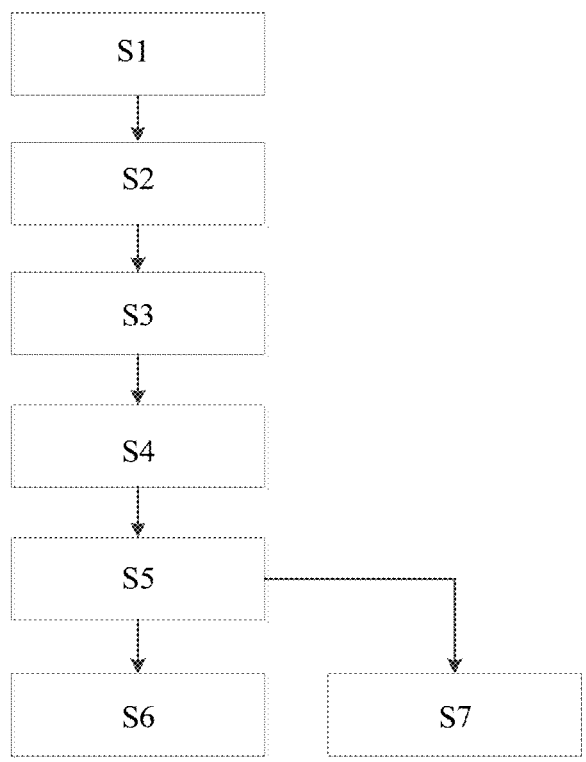
FIG. 11 is a flow chart of a human body inspection method according to an embodiment of the present disclosure.

The present disclosure also provides a method for inspecting a plurality of targets simultaneously using the extensible millimeter wave security inspection system, as shown in FIG. 11. The method includes:

Step S1: in a waiting region, a security inspector assigns a sequence number for each of a plurality of targets to be inspected such that the plurality of targets are distributed to a plurality of security inspection positions in sequence respectively;

Step S2: each of the plurality of targets with assigned by the sequence number reaches the security inspection position corresponding to the sequence number;

Step S3: the security inspector at a remote display terminal verifies a plurality of targets are located at inspection positions by an optical camera, to start scanning; Step S4: the plurality of targets are scanned simultaneously using the extensible millimeter wave security inspection system, so that millimeter wave images and optical images of the plurality of targets are acquired;

Step S5: the data processing device performs intelligent alarm on the millimeter wave images of the plurality of targets by using an automatic recognition algorithm, identifies the plurality of targets based on the optical images of the targets by a face recognition algorithm, and matches the optical images of the plurality of targets with the millimeter wave images of the plurality of targets to output comprehensive security inspection information; and Step S6: the targets pass through a security inspection region.

In an example, the method further includes:

Step S7: if the millimeter wave security inspection system alarms for one or more targets, the alarm information and identification information of the corresponding targets are transmitted to the security inspector at the security inspection exit by a display terminal, so as to intercept the suspicious targets to further inspect them.

As discussed above, such method may achieve simultaneous security inspection for a plurality of human bodies to increase throughput for security inspection significantly.

The extensible millimeter wave security inspection system and the human body inspection method according to embodiments of the present disclosure may achieve millimeter wave human body security inspection of a plurality of targets without increasing the cost of system significantly, so as to increase security inspection throughput significantly, in particular suitable for security inspection sites with large flow of passengers, such as airports, subway stations and real stations.

Although the present disclosure has been explained with reference to the drawings, the embodiments shown in the drawings are only illustrative, instead of limiting the present disclosure.

Although some embodiments of the general inventive concept are illustrated and explained, it would be appreciated by those skilled in the art that modifications may be made in these embodiments without departing from the principles and spirit of the general inventive concept of the present disclosure, the scope of which is defined in the appended claims and their equivalents.

What is claimed is:

1. An extensible millimeter wave security inspection system comprising:
   at least two security inspection passages each provided with at least one scanning unit at least one side of two sides thereof, each scanning unit comprising at least one millimeter wave transceiving module,
   wherein the millimeter wave transceiving module comprises an array of millimeter wave antennas configured to transmit and receive millimeter wave signals and a millimeter wave transceiver associated with the array of millimeter wave antennas, and the millimeter wave transceiving module is arranged to scan, by millimeter wave, a target to be inspected in the security inspection passage along a direction in which the security inspection passage extends,
   wherein the at least two security inspection passages comprises a first security inspection passage and a second security inspection passage adjacent to each other, and wherein a common scanning unit is provided between the first security inspection passage and the second security inspection passage to separate the first security inspection passage from the second security inspection passage, and
   wherein the common scanning unit comprises two scanning operation surfaces that are opposite to each other, one scanning operation surface on which the millimeter wave transceiving module is arranged faces toward the first security passage, and the other scanning operation surface on which the millimeter wave transceiving module is arranged faces toward the second security inspection passage.

2. The extensible millimeter wave security inspection system of claim 1, wherein each scanning unit comprises:
   a first linear transmission device and a second linear transmission device, and
   wherein the millimeter wave transceiving module is slidably connected to the first linear transmission device and the second linear transmission device, the first linear transmission device and the second linear transmission device being arranged to drive the millimeter wave transceiving module to move along the direction in which the security inspection passage extends to achieve scanning operation.

3. The extensible millimeter wave security inspection system of claim 2, wherein each of the first linear transmission device and the second linear transmission device comprises: a rail, a slider, a driving wheel and a transmission belt, the slider being fixed to the millimeter wave transceiving module and the transmission belt and slidably connected to the rail, the driving wheel being engaged with the transmission belt to drive the transmission belt to move; and
   each scanning unit further comprises:
   connection shafts connected to the driving wheels of the first linear transmission device and the second linear transmission device respectively; and
   a motor arranged to drive the connection shafts to rotate.

4. The extensible millimeter wave security inspection system of claim 3, wherein the driving wheel comprises a synchronous gear and the transmission belt comprises a synchronous toothed belt.

5. The extensible millimeter wave security inspection system of claim 2, wherein each scanning unit further includes:

a position sensor configured to acquire position information of the millimeter wave transceiving module in the direction in which the security inspection passage extends; and an optical camera configured to acquire an optical image of the target.

6. The extensible millimeter wave security inspection system of claim 2, wherein the direction in which the security inspection passage extends is a horizontal direction and the array of millimeter wave antennas is arranged in a vertical direction.

7. The extensible millimeter wave security inspection system of claim 1, wherein the at least one scanning unit comprises a first scanning unit, the first scanning unit having a single millimeter wave transceiving module, and wherein the millimeter wave transceiving module is configured to move back and forth along the direction in which the security inspection passage extends, so as to scan and image single target to be inspected.

8. The extensible millimeter wave security inspection system of claim 7, wherein the at least one scanning unit at least comprises two first scanning units adjacent to each other, and wherein the millimeter wave transceiving module in one of the two first scanning units faces towards a security inspection passage which is different from a security inspection passage towards which the millimeter wave transceiving module in the other of the two first scanning units faces.

9. The extensible millimeter wave security inspection system of claim 1, wherein the common scanning unit comprises a second scanning unit provided with a first millimeter wave transceiving module and a second millimeter wave transceiving module, and wherein the first millimeter wave transceiving module and the second millimeter wave transceiving module are located on two opposite sides of the second scanning unit respectively and configured to move back and forth independently and respectively along the direction in which the security inspection passage extends, so as to scan and image two targets to be inspected independently.

10. The extensible millimeter wave security inspection system of claim 9, wherein the first millimeter wave transceiving module and the second millimeter wave transceiving module are configured to move in opposite directions.

11. The extensible millimeter wave security inspection system of claim 1, wherein the common scanning unit comprises a third scanning unit provided with a first millimeter wave transceiving module and a second millimeter wave transceiving module, and wherein the first millimeter wave transceiving module and the second millimeter wave transceiving module are located on two sides of the third scanning unit respectively and driven by a common linear transmission device to move back and forth synchronously along the direction in which the security inspection passage extends, so as to scan and image two targets to be inspected synchronously.

12. The extensible millimeter wave security inspection system of claim 1, further comprising two or more scanning units arranged side by side in a direction perpendicular to the direction in which the security inspection passage extends to form the security inspection passage between adjacent scanning units.

13. The extensible millimeter wave security inspection system of claim 1, further comprising two or more scanning units arranged side by side in a direction parallel to the direction in which the security inspection passage extends to scan a plurality of targets to be inspected in a same security inspection passage simultaneously.

14. The extensible millimeter wave security inspection system of claim 13, wherein all of the millimeter wave transceiving modules in the two or more scanning units are arranged to slide along a same common rail.

15. The extensible millimeter wave security inspection system of claim 13, wherein all of the millimeter wave transceiving modules in the two or more scanning units are arranged to scan the targets to be inspected independently.

16. The extensible millimeter wave security inspection system of claim 1, further comprising:

a data processing device connected by wires or wirelessly to one or more of the millimeter wave transceiving modules to receive holographic data acquired by scanning the targets to be inspected by the one or more of the millimeter wave transceiving modules, wherein each scanning unit further comprises an optical camera configured to acquire an optical image of the target, the data processing device being connected by wires or wirelessly to the optical camera to receive the optical image of the target acquired by the optical camera and process the holographic data and the optical image of the target to give inspection information; and the extensible millimeter wave security inspection system further comprises a display device connected to the data processing device and configured to receive and display the inspection information on one or more targets from the data processing device.

17. A security inspection method for a human body using an extensible millimeter wave security inspection system of claim 16, the extensible millimeter wave security inspection system comprising a plurality of security inspection passages separated by scanning units, the security inspection method comprising:

assigning security inspection positions for a plurality of targets to be inspected and guiding the plurality of targets to the security inspection positions in security inspection passages corresponding to the plurality of targets respectively;

detecting images at the security inspection positions by an optical camera to determine whether the plurality of targets reach the assigned security inspection positions or not and starting scanning operation after determining the plurality of targets have reached the assigned security inspection positions;

scanning the plurality of targets simultaneously using the extensible millimeter wave security inspection system to acquire millimeter wave images and optical images of the plurality of targets;

automatically recognizing the millimeter wave images of the plurality of targets to determine a suspicious target;

identifying the plurality of targets using the optical images;

matching the millimeter wave images of the plurality of targets with the optical images of the plurality of targets to determine identity of the suspicious target.

18. An extensible millimeter wave scanning unit, comprising:

a first millimeter wave transceiving module comprising a first array of millimeter wave antennas configured to transmit and receive millimeter wave signals and a first millimeter wave transceiver associated with the first array of millimeter wave antennas, the first array of millimeter wave antennas being arranged in a vertical direction;

a second millimeter wave transceiving module comprising a second array of millimeter wave antennas configured to transmit and receive millimeter wave signals and a second millimeter wave transceiver associated with the second array of millimeter wave antennas, the second array of millimeter wave antennas being arranged in the vertical direction; and at least one group of linear transmission devices, the first millimeter wave transceiving module and the second millimeter wave transceiving module being slidably connected to a same group of the at least one group of linear transmission devices, the linear transmission devices being configured to drive the first millimeter wave transceiving module and the second millimeter wave transceiving module to move in a horizontal direction, wherein the extensible millimeter wave scanning unit comprises two scanning operation surfaces that are opposite to each other, the second millimeter wave transceiving module is arranged on one scanning operation surface, and the first millimeter wave transceiving module is arranged on the other scanning operation surface, and the first millimeter wave transceiving module and the second millimeter wave transceiving module are configured to be driven by the same group of linear transmission devices to move synchronously.

19. An extensible millimeter wave scanning unit, comprising:
a first millimeter wave transceiving module comprising a first array of millimeter wave antennas configured to transmit and receive millimeter wave signals and a first millimeter wave transceiver associated with the first array of millimeter wave antennas, the first array of millimeter wave antennas being arranged in a vertical direction;

a second millimeter wave transceiving module comprising a second array of millimeter wave antennas configured to transmit and receive millimeter wave signals and a second millimeter wave transceiver associated with the second array of millimeter wave antennas, the second array of millimeter wave antennas being arranged in the vertical direction; and a first group of linear transmission devices and a second group of linear transmission devices, the first millimeter wave transceiving module and the second millimeter wave transceiving module being slidably connected to the first group of linear transmission devices and the second group of linear transmission devices respectively, the first group of linear transmission devices and the second group of linear transmission devices being configured to drive the first millimeter wave transceiving module and the second millimeter wave transceiving module to move in a horizontal direction, wherein the extensible millimeter wave scanning unit comprises two scanning operation surfaces that are opposite to each other, the second millimeter wave transceiving module is arranged on one scanning operation surface, and the first millimeter wave transceiving module is arranged on the other scanning operation surface, and the first millimeter wave transceiving module and the second millimeter wave transceiving module are configured to be driven by the first group of linear transmission devices and the second group of linear transmission devices respectively to move independently.

* * * * *